United States Patent Office 3,518,241
Patented June 30, 1970

3,518,241
ACRYLATE AND METHACRYLATE ESTERS AND POLYMERS THEREOF
Irl N. Duling, West Chester, and Abraham Schneider, Overbrook Hills, Pa., and Robert E. Moore, Wilmington, Del., assignors to Sun Oil Company, Philadelphia, Pa., a corporation of New Jersey
No Drawing. Filed Mar. 24, 1967, Ser. No. 625,581
Int. Cl. C08f 3/64, 3/66
U.S. Cl. 260—89.5                                   10 Claims

ABSTRACT OF THE DISCLOSURE

Alkyl or cycloalkyladamantylacrylates and methacrylates corresponing to the formula

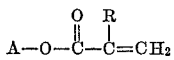

wherein R is hydrogen or methyl and A is an adamantane moiety having 1–4 alkyl and/or cycloalkyl substituents on the adamantane nucleus are disclosed. The ester group is attached to the adamantane nucleus at a bridgehead position. These products, which are normally colorless liquids, can be prepared by esterifying acrylic or methacrylic acid, or preferably their acid chlorides, with a monool corresponding to the moiety A. These unsaturated esters are polymerized, preferably by free radical catalysis, to give solid polymers which have unusually high $T_g$ values, good high temperature stability characteristics and high refractive indexes. The monomers can be used to make homopolymers or copolymers with other unsaturated monomers, and the polymerization can be carried out in a solvent or in bulk. Specific examples of the monomers are 3,5-dimethyladamantyl-1-acrylate and the corresponding methacrylate.

BACKGROUND OF THE INVENTION

This invention relates to unsaturated esters containing an adamantane nucleus and more particularly to alkyl- and /or cycloalkyl-substituted adamantyl esters of acrylic acid or methacrylic acid wherein the adamantane moiety has 1–4 alkyl and/or cycloalkyl substituents. The invention also pertains to polymers and copolymers made by polymerizing such esters.

The cage-like structure of the adamantane nucleus has been illustrated in several ways, of which the following is one example:

As can be seen, it consists of three condensed cyclohexane rings arranged so that there are four bridgehead carbon atoms which are equivalent to each other. In view of these bridgehead carbon atoms, dehydrogenation to form an olefinic double bond within the nucleus cannot occur and hence the nucleus tends to exhibit good thermal stability.

Numerous types of adamantane derivatives have been disclosed in the prior art and a comprehensive tabulation thereof has been presented by Stetter, Angew. Chem. (English ed.), 1 (6), pages 286–298 (1962). However, acrylate and methacrylate esters containing the adamantane nucleus do not appear to have been made heretofore.

DESCRIPTION OF THE INVENTION

The present invention is directed to and provides esters of acrylic acid and methacrylic acid which contain one adamantane nucleus per molecule. More specifically, these esters correspond to the formula

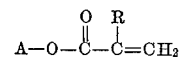

wherein R is hydrogen or methyl depending upon whether the esters are derivatives, respectively, of acrylic acid or methacrylic acid, and A in an adamantane moiety having 1–4 substituents on the adamantane nucleus which substitutents are alkyl or cycloalkyl radicals each having 1–20 carbon atoms. The carboxyl group of these esters is attached to moiety A at a bridgehead carbon atom of the adamantane nucleus.

Preferred compounds of the invention have 1–3 alkyl and/or cycloalkyl groups all attached to the adamantane nucleus at bridgehead positions. More particularly, the preferred esters correspond to the formula

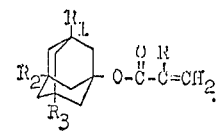

wherein R is hydrogen or methyl, $R_1$ and $R_2$ are radicals having 0–20 carbon atoms selected from the group consisting of hydrogen, alkyl and clcloalkyl, and $R_3$ is an alkyl or cycloalkyl radical having 1–20 carbon atoms. In this preferred class of products, the adamantane nucleus thus has one, two or three hydrocarbyl substituents located at bridgehead positions, which substituents are alkyl, cycloalkyl or combinations thereof.

The above-defined acrylate and methacrylate esters are useful as monomers for preparing solid polymers which can be either homopolymers or copolymers with other vinyl monomers. Such polymers can be made by polymerizing or copolymerizing the foregoing esters by free radical catalysis in conventional manner. By way of illustration, the homopolymers of the preferred class of esters as defined above have repeating units giving a structure corresponding to the formula

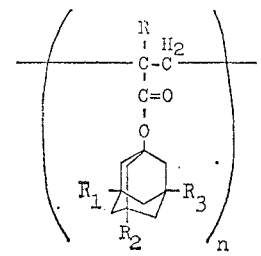

where $n$ represents the number of such repeating units. Presence of the bulky adamantyl groups along the polymer chain gives extraordinarily high glass transition temperatures for the polymers and imparts high temperature stability characteristics as discussed hereinafter.

The monomer esters can be prepared by esterifying acrylic or methacrylic acid, or more preferably their acid chlorides, with an adamantyl monool of the formula AOH where A is as above refined and the hydroxyl group is attached to A at a bridgehead position. Substituted adamantyl monools or alcohols for making the prepared esters correspond to the formula

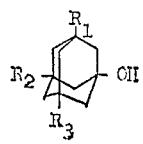

wherein the several R groups are as previously defined. These alcohols, in which all alkyl groups are at bridgehead positions, can be prepared from mono-, di- or trialkylated adamantane hydrocarbons corresponding to the alkyl or cycloalkyladamantyl moiety desired in the product. While the number of carbon atoms in each alkyl or cycloalkyl group can vary widely ranging say up to 20, it is usually preferable that these groups be methyl and/or ethyl since the parent hydrocarbons corresponding thereto are more readily obtainable. Thus the alkyladamantyl moiety, i.e.,

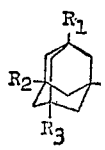

desirably is selected from the following: 1-methyladamantyl; 1,3-dimethyladamantyl; 1-ethyladamantyl; 1-methyl-3-ethyladamantyl; 1,3,5-trimethyladamantyl; and 1,3-dimethyl-5-ethyladamantyl.

The adamantyl alcohols used for making esters according to the invention can also have one or more of the R groups positioned at non-bridgehead positions of the adamantane nucleus. Thus the A group in the alcohol can be an adamantane nucleus having from one to four alkyl and/or cycloalkyl substituents attached thereto at non-bridgehead positions or at both non-bridgehead and bridgehead positions. Examples of these less preferred alcohols for practicing the invention are as follows: 2-methyladamantanol-1; 4-methyladamantanol-1; 4-ethyladamantanol-1; 2,5-dimethyladamantanol-1; 2,4-dimethyladamantanol-1; 4-methyl-3-ethyladamantanol-1; 2,4,6-trimethyladamantanol-1; 2,4,5,7-trimethyladamantanol-1; and 2,3,4-trimethyl-7-ethyladamantanol-1; and higher molecular weight adamantanols corresponding to the foregoing but having higher alkyl and/or cycloalkyl radicals in place of one or more of the methyl or ethyl substituents.

Preparation of the parent hydrocarbons corresponding to alkyl or cycloalkyladamantane moieties as above specified can be carried out by aluminum halide or HF-BF$_3$ catalyzed isomerization of saturaed tricyclic hydrocarbons, as disclosed by Schleyer et al., Tetrahedron Letters No. 9, pp. 305–309 (1961) and Schneider et al., JACS, vol. 86, pp. 5365,–5367 (1964), and in U.S. Pats. Nos. 3,128,-316 and 3,275,700. Higher alkyl or cycloalkyl groups can be substituted on the adamantane nucleus by a Wurtz synthesis involving reacting bridgehead chloro- or bromoadamantanes with alkali metal alkyls or cycloalkyls in the manner disclosed by Spengler et al., Erdöl und Kohle-Erdgas-Petrochemie, vol. 15, pp. 702–707 (1962). Other procedures of making alkyl- or cycloalkyl-substituted adamantanes are described in Schneider United States application Ser. No. 613,443, filed Feb. 2, 1967, now U.S. Pat. No. 3,382,288, and in an article by Hoek et al., 85 (1966) Recueil 1045–1953. The alkylated adamantanes can, for the present purpose, have either non-branched or branched alkyl groups and can have one or more cycloalkyl radicals in the alkylation moiety with the total number of carbon atoms in each group substituted on the adamantane nucleus ranging up to twenty. Preferably these substituents contain no tertiary hydrogen atoms.

It is also preferable that at least one of the R$_1$ and R$_2$ groups be alkyl or cycloalkyl so that the substituted adamantyl moiety wil contain not more than one unsubstituted bridgehead position. This renders the product less susceptible to oxidation. For best oxidation resistance both R$_1$ and R$_2$ are alkayl or cycloalkyl groups so that the nucleus has no tertiary hydrogen substituent.

The starting alkylated adamantane hydrocarbon is first converted to a 1-monool for use as reactant in preparing the present esters. One manner of effecting such conversions is by air oxidation of the parent hydrocarbons at, for example 160° C. in the presence of a metal salt oxidation catalyst, as disclosed in Schneider United States application Ser. No. 395,577, filed Sept. 10, 1964, now U.S. Pat. No. 3,356,740. In the oxidation monools form first and these will subsequently convert to diols if the reaction is allowed to continue too far. Some amounts of ketones are also formed during the oxidation. Production of the monools can be maximized by stopping the oxidation before 70% conversion has been reached.

Another way of preparing 1-monols of the substituted adamantanes is by reacting the latter with an acetic acid solution of chromic acid, as disclosed in Moore United States application Ser. No. 421,614, filed Dec. 28, 1964, and now abandoned. By using a reltaively low mole ratio of Cr to hydrocarbon such as 3:2 good yields of the monool can be obtained.

Preparation of the ester product can be accomplished by known esterification methods. One method comprises refluxing a mixture of acrylic or methacrylic acid and the alkyladamantyl alcohol dissolved in a suitable solvent such as benzene, toluene or heptane and in the presence of an esterification catalyst such as p-toluene sulfonic acid, and trapping out water from the reflux condensate as the esterification reaction proceeds.

The preferred esterification procedure involves reacting the alkyladamantyl alcohol with acrylyl or methacrylyl chloride in accordance with the following equation:

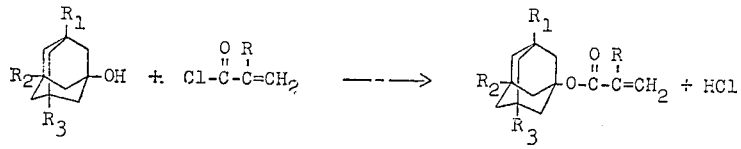

This reaction is carried out by dissolving the alcohol in a hydrocarbon solvent, such as benzene, toluene, hexane, heptane or the like, adding a tertiary amine to the mixture in molar excess relative to the alcohol, and then slowly adding the acid chloride thereto. The amine used preferably is triethylamine, although other teritary amines such as pyridine, tributylamine, N,N,N',N'-tetramethylethylenediamine, triethylenediamine, picolines, quinoline and the like can be employed. Upon addition of the acid chloride, the initial reaction that takes place involves the formation of a complex between it and the amine. This reaction is exothermic and the complex precipitates as it is formed. Slow addition of the acid chloride is continued preferably until the amount added is in molar excess of the alcohol. The resulting slurry is then stirred at a temperature in the range of 10–65° C., more preferably 20–60° C., to effect the esterification reaction. A temperature above 65° C. should be avoided as this tends to cause a messy reaction, and it is most preferable to maintain the temperature at 40–50° C. Time required for completion of the reaction will depend upon the reaction temperature used but generally is in the range of 1–20 hours.

As the reaction occurs the amine-acid chloride complex is replaced by an amine-HCl complex which is also insoluble in the hydrocarbon solvent. The alkyladamantyl-acrylate or methacrylate product on the other hand remains in solution. After completion of the reaction, the mixture is filtered to remove the amine-HCl complex and the solvent is removed by evaporation. The crude product ester obtained as residue is a reddish liquid. This can be purified by vacuum distillation, after addition of a polymerization inhibitor such as hydroquinone or bis(2-hydroxy-3-t-butyl-5-methylphenyl)methane, to give a sweet smelling, colorless liquid as the desired ester product.

The alkylated adamantane acrylates and methacrylates prepared as above described can be polymerized or copolymerized in conventional manner by free radical catalysis using a free radical initiator such as hydrogen peroxide, benzoyl peroxide, dicumyl peroxide, di-t-butyl-peroxide or azobisisobutyronitrile. Procedures for polymerizing and copolymerizing acrylates and methacrylates are well known and need not be elaborately described here. Discussion of such procedures and of numerous uses of the resin products are given in Encyclopedia of Chemical Technology, vol. 1, 2nd ed. (1963), pp. 303–311, and similar procedures are applicable here for preparing polymers and copolymers having analogous uses. The present acrylates and methacrylates can be polymerized alone or together, or can be copolymerized with other unsaturated monomers, e.g., ethylene, propylene, butadiene, vinylcyclohexene, dicyclopentadiene, vinylacetate, acrylonitrile, methacrylonitrile, styrene, α-methyl or α-chlorostyrene, vinylchloride, vinylidene chloride, methylacrylate, methylmethacrylate, vinylpyrrolidone, vinylpyridine, maleic anhydride, and methyl or ethyl vinyl ether and the like.

The polymerization or copolymerization reaction preferably is carried out employing a solvent such as benzene or toluene at elevated temperature such as 50–80° C. The acrylae or methacrylate monomer is dissolved in the solvent, a small amount such as 0.05–0.5% of the free radical initiator is added to the mixture, the mixture is degassed and then heated to and maintained at the selected temperature level until the desired degree of polymerization has been attained. The polymer, which remains in solution, can then be recovered in conventional manner by adding an antisolvent such as methanol, separating the precipitated polymer and drying.

The polymerization also can be carried out without a solvent, and the polymer in such case usually will be cross-linked and at least partially insoluble in organic solvents. Consequently such bulk polymerizations are generally applicable where the polymer is to be produced in the form desired for use, for example, as a cast form or sheet. In carrying out these polymerizations a suitable free radical initiator, such as benzoyl peroxide or azobisisobutyronitrile, is dissolved in the alkyladamantylacrylate or methacrylate, the mixture is degassed and polymerization conditions are established by heating to say 60° C. or by the application of ultraviolet light at room temperature. Polymerization with cross-linking readily occurs, giving a hard glassy polymer. Use of the present monomers in place of conventional acrylates or methacrylates in such bulk polymerizations can be distinctly advantageous in that substantially less shrinkage occurs. For example, with methyl methacrylate 25–30% shrinkage may occur upon polymerization, whereas for the present monomers 4–8% shrinkage is typical.

The acrylate and methacrylate monomers of the present invention can also be polymerized to high molecular weight polymers by means of anionic catalysts. This kind of catalysis for making polymers from other types of acrylates and methacrylates has been described in various literature references and similar conditions for anionic polymerization of the present monomers can be used. Examples of anionic catalysts which have been employed are: Grignard reagents such as alkyl or phenyl magnesium bromide (Garrett et al., JACS, 81, 1007–1008 (1959), and Gaylord et al., Linear and Stereospecific Addition Polymers, 531 (1959)); butyllithium or fluorenylsodium (Graham et al., JACS, 82, 2100–2103 (1960)); sodium naphthalene (Graham et al., J. Poly. Sci., 44, 411–419 (1960)); and lithium dispersions (Miller et al., JACS, 80, 4115–4116 (1958)). These and other known anionic catalysts can be used for converting the present monomers to polyacrylate or polymethacrylate resins of high molecular weight.

Resins made from the alkyladamantyl or cycloalkyladamantylacrylates or methacrylates of the present invention have extraordinarily high glass transition temperatures by virtue of the bulky adamantyl groups appended along the polymer chain. These resins accordingly have high softening points permitting their use at relatively high temperatures and they also have high surface hardness characteristics. Further they have high refractive indexes and thus are particularly useful as optical lens material.

The unusually high glass transition temperatures ($T_g$) of the present polymers can be seen by comparison with $T_g$ values reported in the literature for conventional polyacrylates and polymethacrylates. Typical $T_g$ values for conventional polymers are given in Encyclopedia of Chemical Technology, loc. cit., p. 308, and by Krause et al., J. Poly. Sci., 3, 3573–3586 (1965). For polyacrylates made from various alkylesters, these references show $T_g$ values ranging from −80° C. (for n-octyl) to 43° C. (for t-butyl). In comparison, $T_g$ values found for our homopolymers made from the bridgehead acrylate of 3,5-dimethyladamantanol-1 typically are 100–107° C. Further, the prior art shows $T_g$ values for polymers of alkyl methacrylates ranging from 60° C. (sec-butyl) to 107° C. (t-butyl) whereas typical $T_g$ values for our polymethacrylate products derived from 3,5-dimethyladamantanol-1 are 190–198° C.

Still another advantage of resins made from the present esters results from the stability of the adamantane nucleus as mentioned above. Ester groups made from conventional alcohols of two or more carbon atoms can undergo thermal decomposition by transfer of a hydrogen atom from the beta position of the alcohol-derived moiety in the following manner:

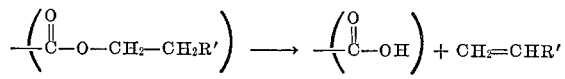

This type of decomposition results, as shown, in the conversion of the ester group to a carboxylic acid group and an olefin. While prior art acrylate or methacrylate resins can undergo this type of decomposition at high temperature, resins made from the present ester products cannot as this would require the formation of a double bond in the adamantane nucleus which, as previously stated, cannot occur.

The following examples are specific illustrations of the invention:

Example 1

This illustrates the preparation of 3,5-dimethyl-1-adamantylacrylate by the reaction of 3,5-dimethyl-1-adamantanol (DMAO) with acrylyl chloride. 10 g. of DMAO (0.055 mole) were dissolved in a mixture of 75 ml. of benzene and 5 ml. of pyridine (0.062 mole). Acrylyl chloride in amount totaling 5.4 g. (0.06 mole) was added dropwise over a time of 0.5 hour while the mixture was stirred and cooled. A complex between the acrylyl chloride and pyridine precipitated, forming a slurry. The mixture was stirred for 6 hours at room temperature to complete the reaction. The pyridine-HCl complex that had been formed was separated by filtering the mixture, and solvent was evaporated from the filtrate leaving a reddish liquid residue. This was shown by vapor phase chromatography and IR analysis to be mainly 3,5-dimethyl-1-adamantylacrylate. To the crude product was added a small amount of a polymerization inhibitor, viz. bis(2-hydroxy-3-t-butyl-5-methylphenyl)methane, and the mixture was then vacuum distilled to give 6 g. of pure 3,5- dimethyl-1-adamantylacrylate. This product was a colorless, sweet-smelling liquid having the following properties:

| | |
|---|---|
| Density, 20°/4° | 1.0255 |
| Refractive index, 20°/D | 1.4873 |
| Refractive dispersion at 20° | 104 |
| Hydrogen red line | 1.4847 |
| Hydrogen blue line | 1.4951 |
| KV at 100° F., cs. | 7.2 |

Example 2

The same ester as in Example 1 was again prepared but using acrylic acid instead of the acid chloride. A solution of 12.01 g. of acrylic acid and 9.98 g. of DMAO (acid:alcohol molar ratio=3:1) in 250 ml. of toluene was prepared and 0.5 g. of p-toluene sulfonic acid was added as esterification catalyst. The mixture was then refluxed and water formed in the reaction was trapped out of the condensate. After 28 hours 0.5 g. more of the catalyst was added and refluxing was continued for a total time of 72 hours. The reaction mixture was then washed with aqueous $Na_2CO_3$ and dried, and the solvent was evaporated. The residue was distilled and a fraction (5.12 g.) of substantially pure 3,5-dimethyl-1-adamantylacrylate having essentially the same properties as given in Example 1 was obtained.

Comparison of reaction times for Examples 1 and 2 shows that esterification of the DMAO is more readily achieved by using the acrylyl chloride rather than acrylic acid.

Example 3

In this example DMAO was reacted with methacrylyl chloride to produce 3,5-dimethyl-1-adamantylmethacrylate. More specifically 27 g. (0.15 mole) of DMAO were dissolved in 200 ml. of benzene, 65 ml. (0.47 mole) of triethylamine were added and 30 ml. (0.31 mole) of methacrylyl chloride were added dropwise to the mixture while cooling and stirring. The mixture was then stirred overnight to insure completion of the reaction. Triethylamine and HCl formed were removed by washing the mixture successively with water, aqueous NaOH and water, following which the mixture was dried over $MgSO_4$. A small amount of free radical inhibitor was added, the solvent was distilled off and the reaction product was then vacuum distilled to recover the methacrylate ester. This product was a colorless liquid having a slight sweet odor and the following properties:

| | |
|---|---|
| Density, 20°/4° | 1.004 |
| Refractive index, 20°/D | 1.4890 |

Example 4

This example illustrates the preparation of polymer from 3,5-dimethyl-1-adamantylacrylate. The reaction was carried out in a dried container which had been carefully purged with nitrogen to exclude air. The reaction mixture consisted of 1.0 g. of the acrylate product prepared in Example 1 and 5 ml. of benzene to which had been added 0.003 g. of benzoyl peroxide as a free radical initiator (0.3% by weight based on the monomer). The mixture was heated to and maintained at 65° C. for 16 hours, resulting in a viscous solution of polymer in benzene. This solution was poured into absolute methanol to precipitate the polymer, which was separated, dried and pulverized to yield a white amorphous powder. Properties of this poly(dimethyladamantylacrylate) product were as follows:

| | |
|---|---|
| Molecular weight ($\overline{M}n$ by osomometry) | 141,000 |
| Density (20°/4°) | 1.014 |
| Inherent viscosity (in benzene at 100° F.) | 0.35 |
| Glass transition temperature ($T_g$), °C. | 100 |
| Refractive index (20°/D) | 1.50 |

Examples 5–11

A series of polymerization runs was made with 3,5-dimethyl-1-adamantylacrylate as the monomer, benzene as solvent and a reaction temperature of about 60° C. In each run a solution of 1.0 g. of the monomer in 4–5 ml. of benzene containing a small amount of initiator was prepared and the mixture was degassed by freezing and evacuation. The degassed mixture was heated under nitrogen to about 60° C. and maintained at that temperature for times as shown in Table I. In run Nos. 5–9 the initiator was benzoyl peroxide (designated "BP") and in run Nos. 10–11 azobisisobutyronitrile ("AIBN"), the proportions of initiator being shown in Table I. After the reaction the polymer was precipitated from solution, separated and dried. Typically the polymer thus obtained is a white powder which when heated and molded gives a clear, colorless article. Also typically, all of these polyacrylates have glass transition temperatures ($T_g$) of 100° C. or above.

TABLE I.—PREPARATION OF POLY(DIMETHYLADAMANTYLACRYLATES)

| Run No. | Initiator (percent) | Reaction time, hrs. | Polymer yield, percent | R.I. 20/D | Inherent viscosity [1] | Density, 20/4 | M.P., °C. (capillary) | $T_g$, °C. |
|---|---|---|---|---|---|---|---|---|
| 5 | BP (0.12) | 64 | 72 | | 0.65 | | 200 d | >100 |
| 6 | BP (0.24) | 17 | 73 | 1.502 | 0.59 | | d. >280 | >100 |
| 7 | BP (0.26) | 19 | 68 | 1.508 | 0.39 | 1.04 | | >100 |
| 8 | BP (0.36) | 19 | 50 | 1.496 | 0.47 | 1.02 | 290 d. (softens >170). | >100 |
| 9 | BP (0.37) | 17 | 71 | 1.496 | 0.50 | | d. >245 | >100 |
| 10 | AIBN (0.14) | 66 | 98+ | | 0.34 | 1.09 | | 106 |
| 11 | AIBN (0.08) | 40 | 98+ | | 0.44 | | | |

[1] In benzene at 100° F. and concentration of 0.5 g./100 ml. of benzene.

Examples 12–16

Another series of runs was made in generally the same manner as in the above series execpt that a methacrylate monomer was used, viz. 3,5-dimethyl-1-adamantylmethacrylate, prepared by the procedure of Example 3. All of the polymer products were white powders and when molded into discs gave clear, colorless articles. Results are given in Table II.

TABLE II.—PREPARATION OF POLY(DIMETHYLADAMANTYLMETHACRYLATES)

| Run No. | Initiator (percent) | Reaction time, hrs. | Polymer yield, percent | R.I. 20/D | Inherent viscosity [1] | Density, 20/4 | $T_g$, °C. |
|---|---|---|---|---|---|---|---|
| 12 | BP (0.20) | 44 | 20 | | 0.55 | | 190 |
| 13 | AIBN (0.10) | 70 | 45 | | 0.65 | | 187–190 |
| 14 | AIBN (0.10) | 88 | 62 | 1.508 | 0.89 | 1.052 | 197–198 |
| 15 | AIBN (0.09) | 40 | 71 | | 0.90 | 1.046 | 196 |
| 16 | AIBN (0.10) | 71 | 85 | | 0.86 | 1.034 | 204 |

[1] In benzene at 100° F. and concentration of 0.5 g./100 ml. of benzene.

The $T_g$ values given in Tables I and II show that the polymers provided by the present invention have inordinately high glass transition temperatures as compared with known polyacrylate or polymethacrylate resins. The high values exhibited by the present polymers allow them to be used at higher temperatures than are permissible with conventional acrylic resins.

Examples 17–19

Three runs were made at 25° C., using monomers derived from DMAO and without any added initiator, by ultraviolet (UV) light irradiation of solutions of the monomers at concentrations of 0.20–0.25 g./ml. of solvent. Data for these runs are shown in Table III. In each case the final reaction mixture before addition of antisolvent (methanol) was a viscous solution except that in run No. 18 a portion of the polymer was insoluble.

TABLE III.—PHOTO-INITIATED SOLUTION POLYMERIZATIONS

| Run No. | Monomer | Solvent | Reaction time, hrs. | Polymer yield, percent | Inherent viscosity [1] | $T_g$, °C. |
|---|---|---|---|---|---|---|
| 17 | Acrylate | Chloroform | 18 | 98+ | 0.20 | |
| 18 | do | Cyclohexane | 18 | 80 | 0.38 | |
| 19 | Methacrylate | do | 14 | 60 | 0.15 | 157 |

[1] In benzene at 100° F. and concentration of 0.5 g./100 ml. of benzene.

Examples 20–24

Five bulk polymerization runs (no solvent) were made as shown in Table IV, all with monomers derived from DMAO. As indicated in the table, UV light was employed in three runs and benzoyl peroxide was added in three runs one of which was a thermal (60° C.) polymerization without UV light, and triphenylphosphine (TPP) was used as initiator in another run.

TABLE IV.—BULK POLYMERIZATIONS

| Run No. | Monomer | Initiator (percent) | UV light | Reaction temp., °C. | Reaction time, hrs. | Nature of polymer |
|---|---|---|---|---|---|---|
| 20 | Acrylate | BP (0.16) | No | 60 | 44 | Partially cross-linked solid. |
| 21 | do | BP (0.14) | Yes | 25 | ¼ | Cross-linked glassy solid. |
| 22 | do | BP (0.15) | Yes | 25 | 3½ | Do. |
| 23 | do | None | Yes | 25 | 28 | Do. |
| 24 | do | TPP (0.15) | Yes | 25 | (5 min.) | Do. |

When other alkyl or cycloalkyladamantyl alcohols as herein specified are substituted for the dimethyladamantanol in Examples 1–3 above, substantially equivalent results are obtained. Further, when any of the acrylic or methacrylic esters obtained by these substitute reactions are used to make polymers as herein disclosed, resins are obtainable having desirable characteristics attributable to the presence of the alkyladamantyl groups pendant from the polymer chains. Also, any of these esters can be copolymerized with other vinyl monomers as previously discussed to yield copolymer resins containing the alkyladamantyl groups.

We claim:

1. An unsaturated ester corresponding to the formula

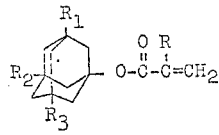

wherein R is hydrogen or methyl, $R_1$ and $R_2$ are radicals having 0–20 carbon atoms selected from the group consisting of hydrogen, alkyl and cycloalkyl, and $R_3$ is an alkyl or cycloalkyl radical having 1–20 carbon atoms.

2. An acrylate ester in accordance with claim 1.

3. An ester according to claim 2 wherein the moiety

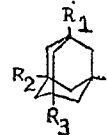

is selected from the group consisting of 1-methyladamantyl, 1,3-dimethyladamantyl, 1-ethyladamantyl, 1-methyl-3-ethyladamantyl, 1,3,5-trimethyladamantyl and 1,3-dimethyl-5-ethyladamantyl.

4. A methacrylate ester in accordance with claim 1.

5. An ester according to claim 4 wherein the moiety

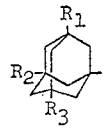

is selected from the group consisting of 1-methyladamantyl, 1,3-dimethyladamantyl, 1-ethyladamantyl, 1-methyl-3-ethyladamantyl, 1,3,5-trimethyladamantyl and 1,3-dimethyl-5-ethyladamantyl.

6. A polymer made by polymerizing a monomer as defined in claim 1.

7. A polymer made by polymerizing a monomer as defined in claim 2.

8. A polymer made by polymerizing a monomer as defined in claim 3.

9. A polymer made by polymerizing a monomer as defined in claim 4.

10. A polymer made by polymerizing a monomer as defined in claim 5.

References Cited

UNITED STATES PATENTS 3,342,880  8/1967  Reinhardt _____ 260—89.5

HARRY WONG, JR., Primary Examiner

U.S. Cl. X.R.

204—159.22; 260—78.5, 83.5, 85.5, 86.1, 86.3, 86.7, 486